(12) United States Patent
Jones et al.

(10) Patent No.: US 7,006,206 B2
(45) Date of Patent: Feb. 28, 2006

(54) METHOD AND APPARATUS FOR DETECTING PEAKS IN AN OPTICAL SIGNAL USING A CROSS-CORRELATION FILTER

(75) Inventors: D. Ralph Jones, Guilford, CT (US); David G. Bellemore, Fairfield, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/427,712

(22) Filed: May 1, 2003

(65) Prior Publication Data

US 2004/0218170 A1    Nov. 4, 2004

(51) Int. Cl.
*G01N 21/00* (2006.01)
(52) U.S. Cl. .................................. 356/73.1
(58) Field of Classification Search ........... 356/73.1; 398/39–72, 94–104; 375/343, 350, 354, 375/355, 364–368
See application file for complete search history.

(56) References Cited

U.S. PATENT DOCUMENTS 5,995,255 A    11/1999 Giles

| | | | |
|---|---|---|---|
| 6,346,702 B1 | 2/2002 | Davis et al. | |
| 6,529,923 B1 | 3/2003 | Davis et al. | |
| 6,738,437 B1 * | 5/2004 | Chi et al. | 375/343 |
| 2002/0147548 A1 * | 10/2002 | Walther et al. | 702/20 |
| 2003/0077660 A1 * | 4/2003 | Pien et al. | 435/7.1 |

OTHER PUBLICATIONS

U.S. Appl. No. 10/159,370, J. A. Moon et al., "Optical Channel Monitor", filed May 31, 2002.

* cited by examiner

*Primary Examiner*—Tu T. Nguyen

(57) ABSTRACT

A method and apparatus is provided for detecting peaks in an optical signal. The method comprises the three basic steps of: (1) sampling the optical signal to obtain sampled data containing information about the optical signal; (2) applying a cross-correlation filter on the sampled data to obtain cross-correlated data containing information about one or more peaks in the optical signal; and (3) detecting the one or more peaks in the optical signal based on the cross-correlation data. In one embodiment, the cross-correlation filter has an average value that is less than zero. The step of applying the cross-correlation filter includes reducing random noise present in the sampled data to remove quasi-dc components from the sampled data.

20 Claims, 14 Drawing Sheets

High and Low Gain Data Combined

Detail

Figure 1B(2)

Full data set

– – – – Representation of minimum allowed channel power

Figure 1B(1)

Savitzky-Golay Smoothing Filter and Cross-Correlation Filter

Data Scaled to 16-bit Short Values

Detail

Figure 1D(2)

Full data set

Figure 1D(1)

Output of Cross-Correlation
*(Zoomed In)*

X-corr data after –ve clamp

Figure 1E(2)

Raw X-corr data

Compute Root

METHOD AND APPARATUS FOR DETECTING PEAKS IN AN OPTICAL SIGNAL USING A CROSS-CORRELATION FILTER

BACKGROUND OF THE INVENTION

1. Technical Field

The present invention relates to a method and apparatus for detecting peaks in an optical signal; and more particularly to a method and apparatus for doing the same in an optical channel monitor or other optical device.

2. Description of Related Art

In an optical communication network, information may be communicated from one point to another using a wavelength division multiplexed optical signal, which typically has one or more optical channels respectively centered on one or more optical wavelengths $\lambda_1, \lambda_2, \lambda_3, \ldots \lambda_N$. Each optical channel is typically used to carry different information in the optical communication network.

In the optical communication network, an optical channel monitor may be used to sense and/or monitor one or more parameters of the one or more optical channels in the wavelength division multiplexed optical signal. The one or more parameters may include channel presence, channel power, channel signal-to-noise ratio and channel wavelength. The information about the one or more parameters may be used, for example; to assess whether the optical communication network is working properly. For instance, if the power of a channel is too weak, or a channel is not present, or the signal-to-noise ratio of a channel is too low, this is likely to indicate that there is a problem in the optical communication network that must be addressed.

By way of example, U.S. Pat. No. 5,995,255 discloses one such optical channel monitor, entitled "Concatenated Fiber Grating Optical Monitor," that is a wavelength division multiplexing (WDM) optical monitor based on concatenated fiber gratings and which uses a modulator and detector.

SUMMARY OF THE INVENTION

In its broadest sense, the invention provides a new and unique method and apparatus for detecting peaks in an optical signal. The method comprises the three basic steps of: (1) sampling the optical signal to obtain sampled data containing information about the optical signal; (2) applying a cross-correlation filter on the sampled data to obtain cross-correlated data containing information about one or more peaks in the optical signal; and (3) detecting the one or more peaks in the optical signal based on the cross-correlation data.

In one embodiment, the cross-correlation filter has an average value that is less than zero.

The method also includes the step of smoothing the sample data using a Savitzky-Golay smoothing filter to reduce random noise present in the sampled data. The Savitzky-Golay smoothing filter is based on the concept of using a weighted running average to smooth the sampled data.

The peak detecting step may include clamping the cross-correlated data so that all cross-correlated data having a value less than zero is clamped to equal zero. The detecting step may also include filtering the cross-correlated data so that all potential peaks have a height in cross-correlation space greater than 1% of a maximum peak height; taking a derivative of the cross-correlated data to derive a positive-to-negative zero-crossing to detect the one or more peaks; and applying a zero-crossing test to detect potential peaks. Moreover, the peak detecting step may include applying one or more peak rejection criteria tests, including either a width-depth test based on the cross-correlation data, a compute root test based on the cross-correlation data by comparing a peak position in relation to a zero-cross location, an absolute power test based on the sampled data, one relative power test based on the cross-correlation data, another relative power test based on the sampled data, or a combination thereof.

Figure 1:
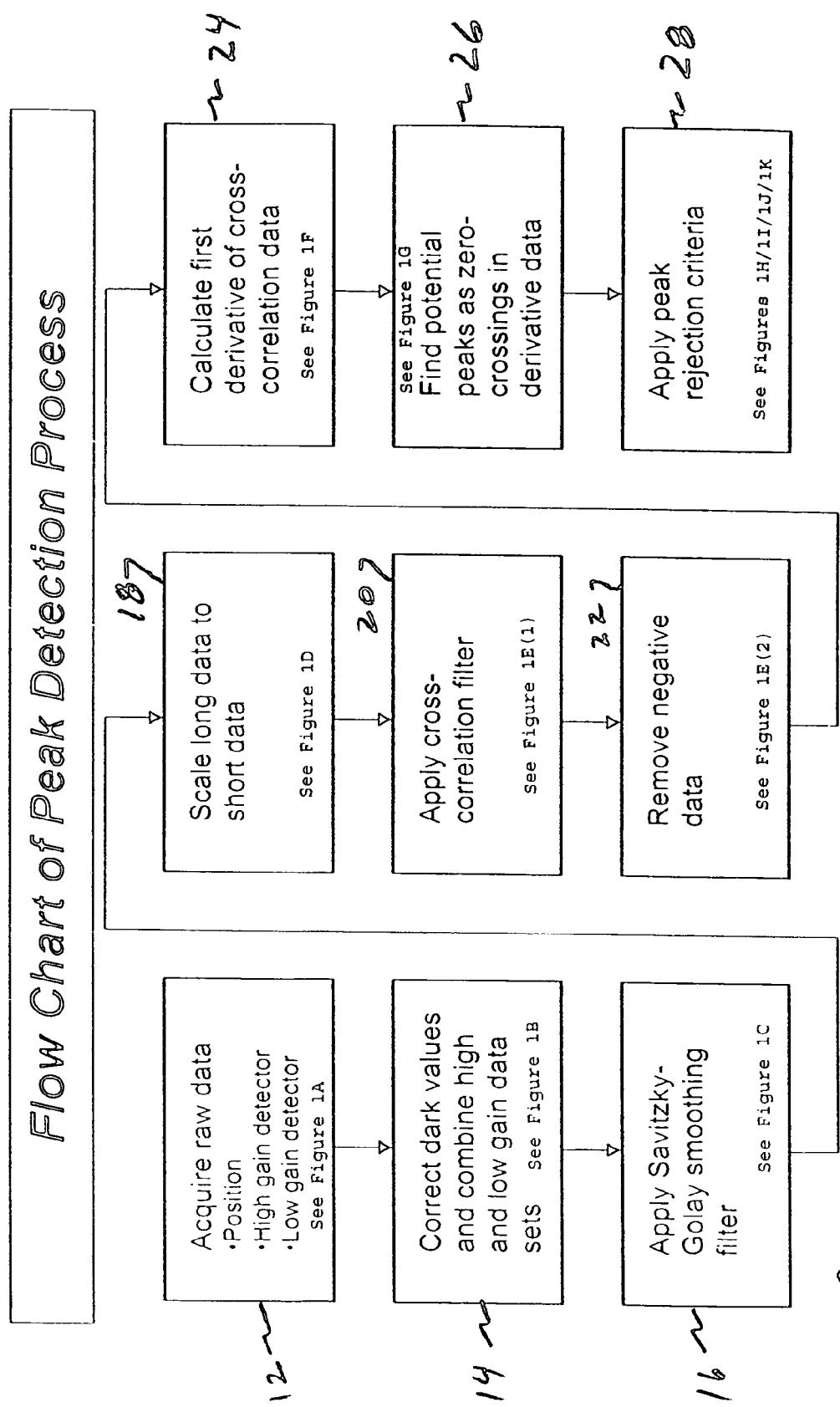
FIG. 1 is a flow chart of a peak detection process in accordance with the present invention.
Figure 1A:
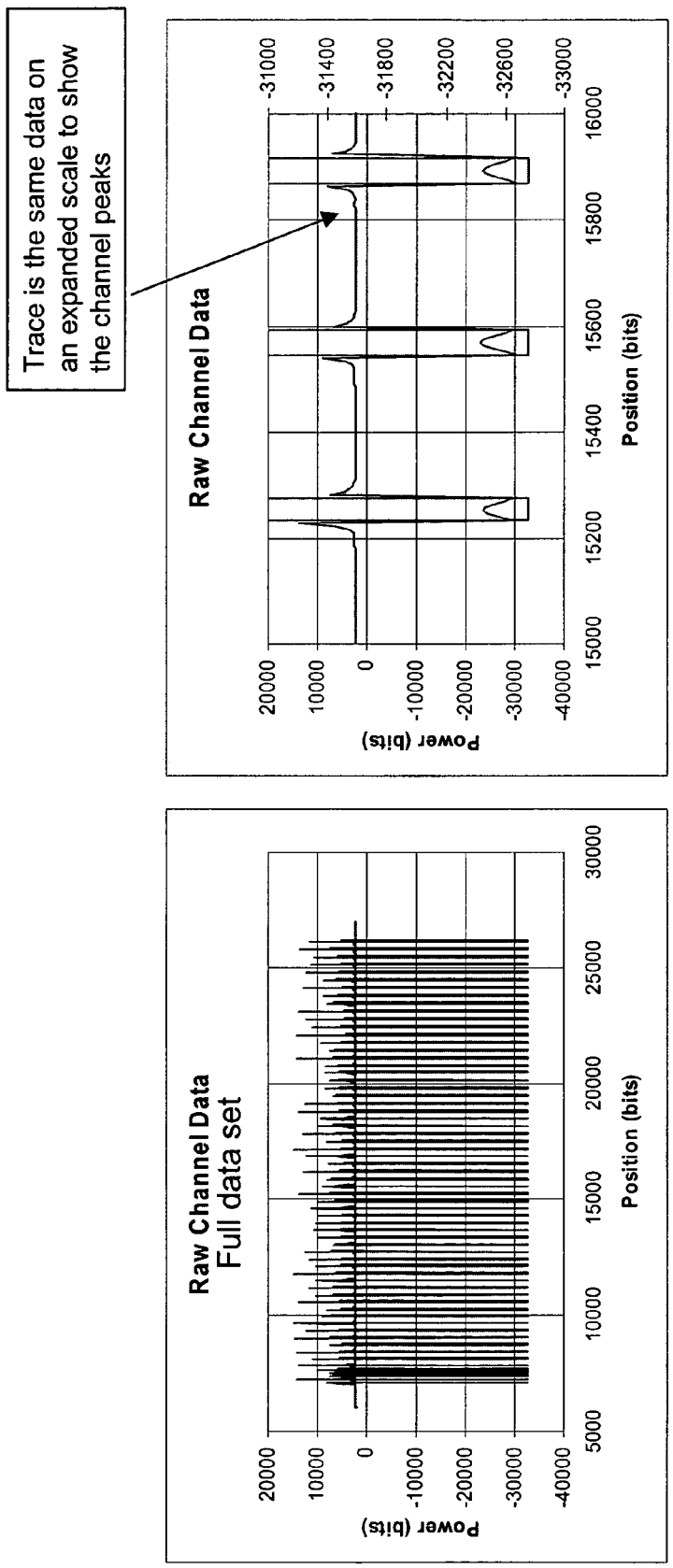
FIG. 1A relates to raw data acquired from hardware with respect to the sampling step 12 shown in FIG. 1, and includes FIG. 1A(1) showing a graph of a full data set of raw data plotted with power in bits versus position in bits, while FIG. 1A(2) is a graph of a detailed data set of the raw channel data between positions 15,000 and 16,000 shown in FIG. 1A(1).
Figure 1B:
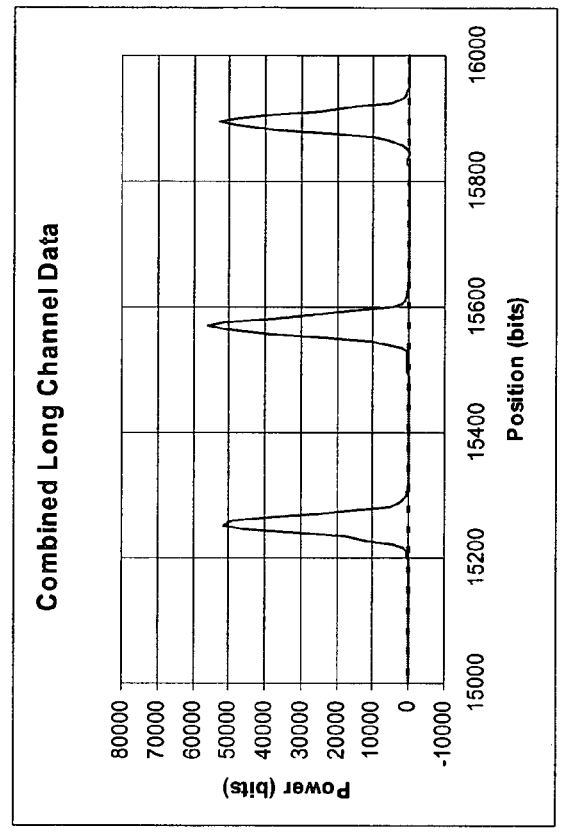
FIG. 1B relates to high and low gain data combined with respect to the combining step 14 shown in FIG. 1, and includes FIG. 1B(1) showing a graph of a full data set of combined long channel data plotted with power in bits versus position in bits, while FIG. 1B(2) is a graph of a detailed data set of the combined long channel data between positions 15,000 and 16,000 shown in FIG. 1B(1).
Figure 1B:
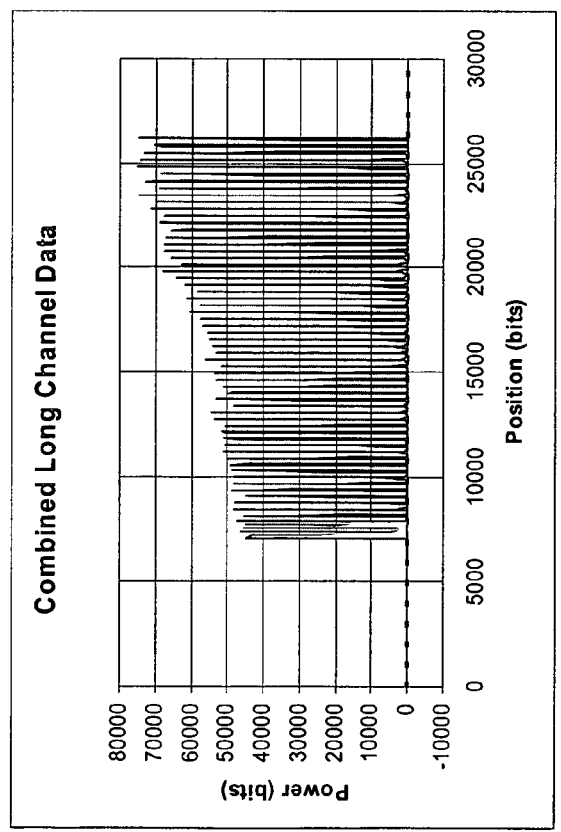
Figure 1C:
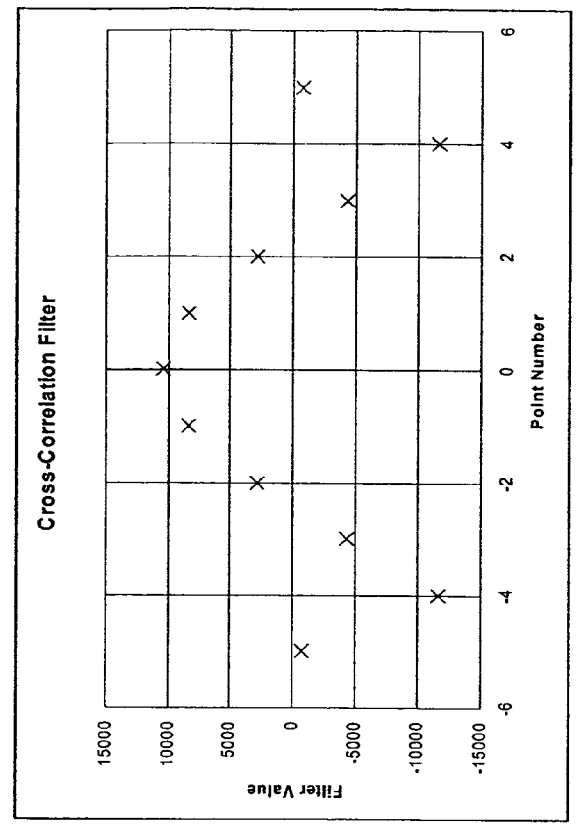
FIG. 1C relates to a Savitzky-Golay smoothing filter and cross-correlation filter with respect to the applying steps 16 and 20 shown in FIG. 1, and includes FIG. 1C(1) showing a graph of a 3rd order Savitzky-Golay smoothing filter plotted with filter value versus point numbers in relation to step 16, while FIG. 1C(2) is a cross-correlation filter plotted with filter value versus point numbers in relation to step 20.
Figure 1C:
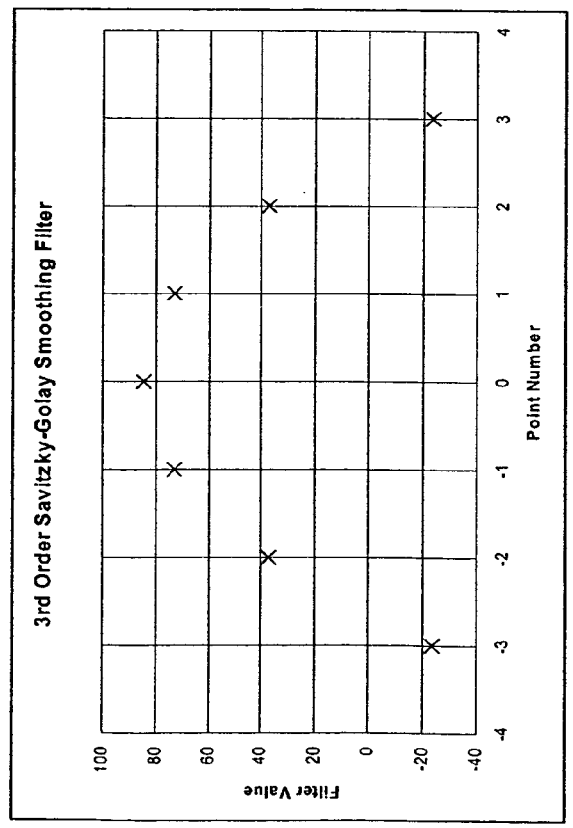
Figure 1D:
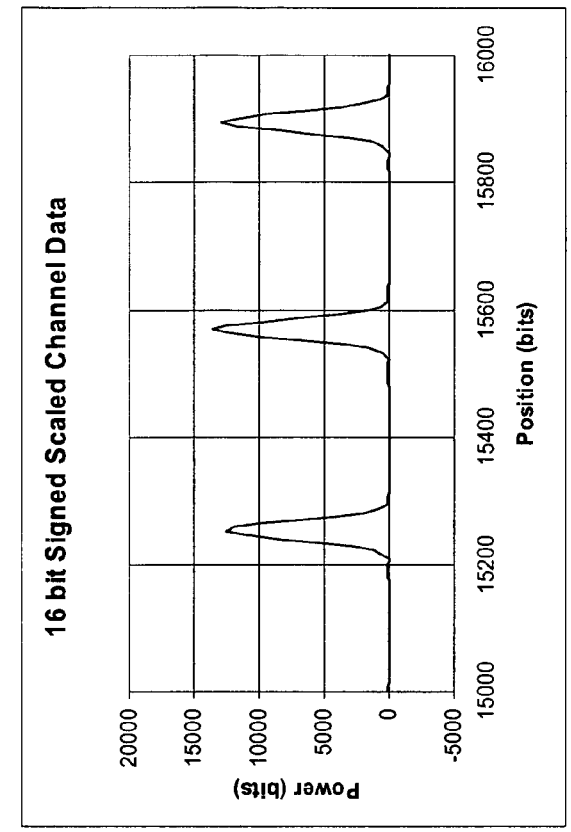
FIG. 1D relates to data scaled to 16-bit short values with respect to the scaling step 18 shown in FIG. 1, and includes FIG. 1D(1) showing a graph of a full data set of 16 bit signed scaled channel data plotted with power in bits versus position in bits, while FIG. 1D(2) is a graph of a detailed data set of the 16 bit signed scaled channel data between positions 15,000 and 16,000 shown in FIG. 1D(1).
Figure 1D:
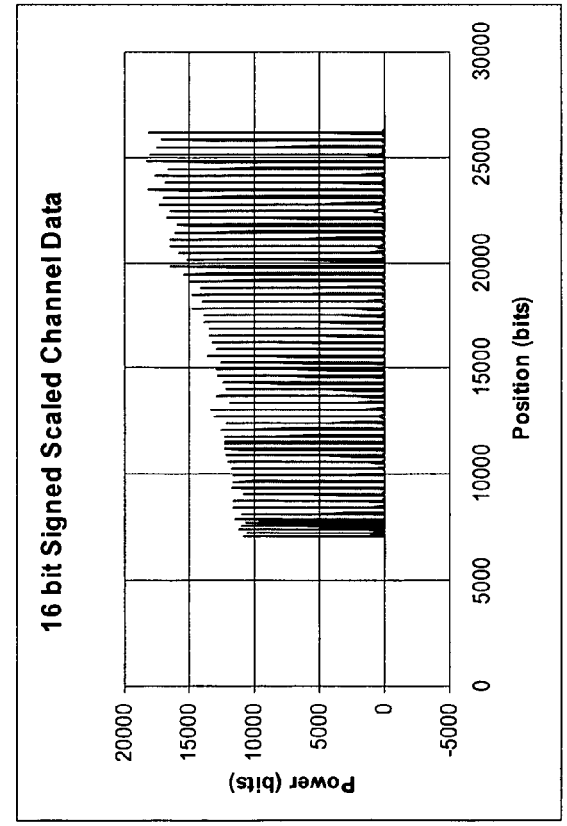
Figure 1E:
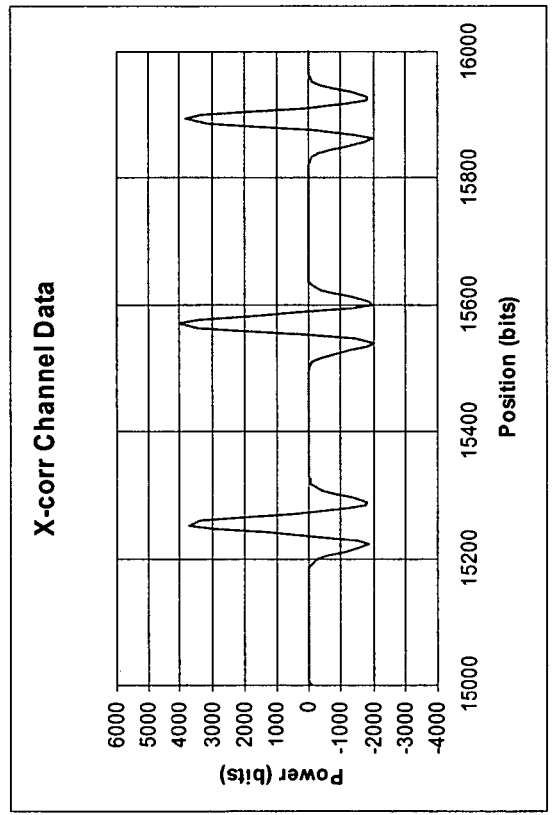
FIG. 1E relates to an output of cross-correlation with respect to the remove step 22 shown in FIG. 1, and includes FIG. 1E(1) showing a graph of a raw cross-correlation data set of a channel data plotted with power in bits versus position in bits, while FIG. 1E(2) is a graph of a detailed data set of the raw cross-correlation data of a channel data after clamping between positions 15,000 and 16,000 shown in FIG. 1E(1).
Figure 1E:
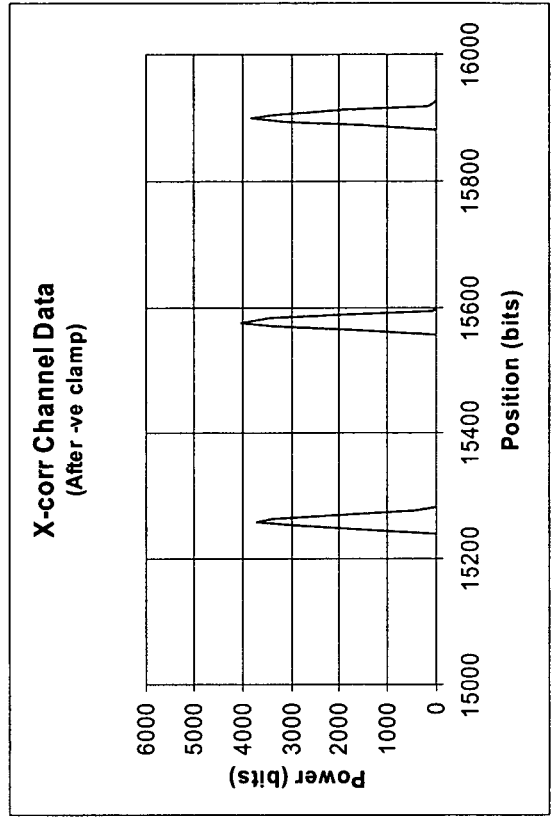
Figure 1F:
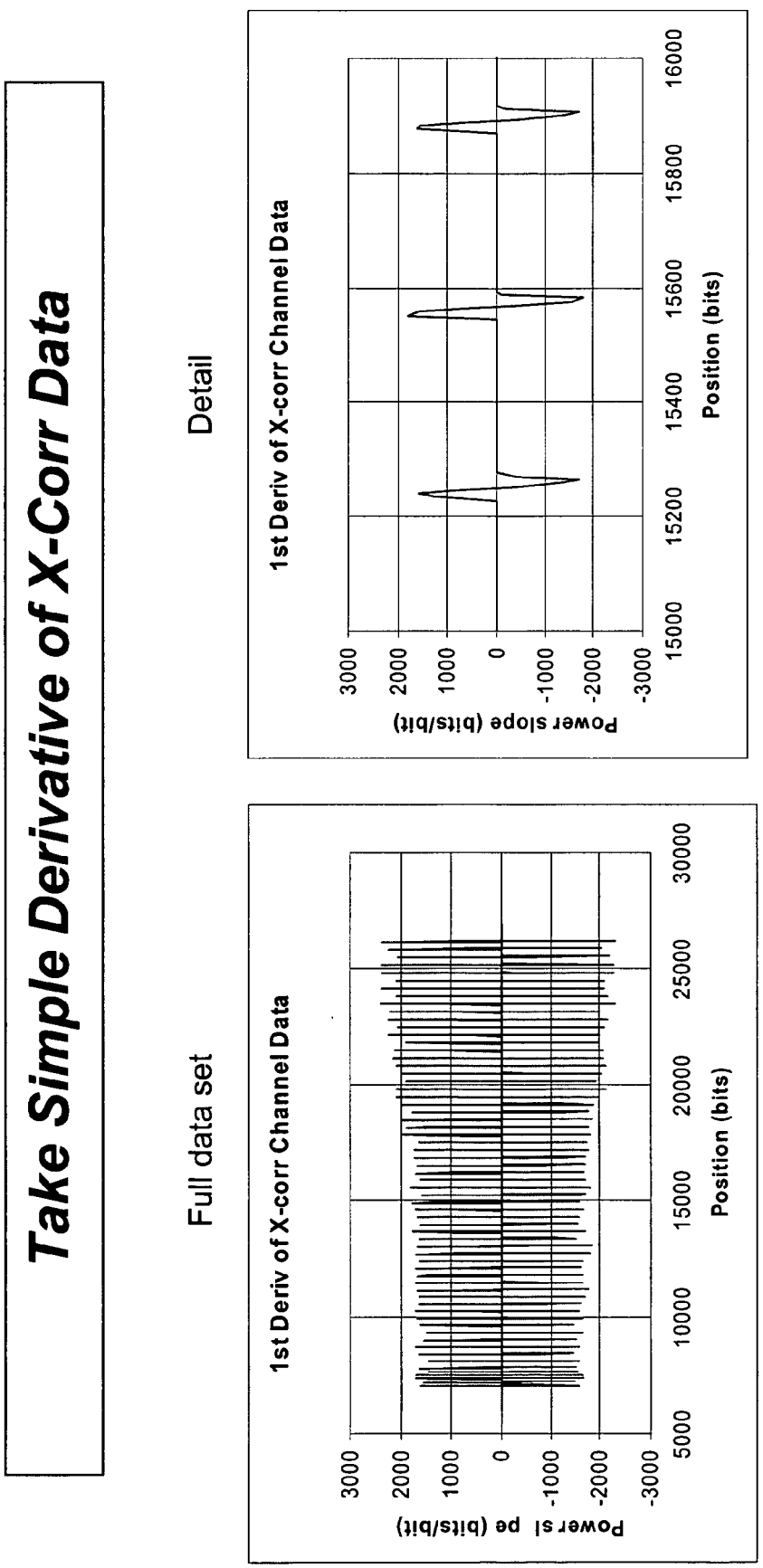
FIG. 1F relates to taking a simple derivative of cross-correlation data with respect to the calculation step 24 shown in FIG. 1, and includes FIG. 1F(1) showing a graph of a full data set of a 1st derivative of cross-correlation channel data with power in bits versus position in bits, while FIG. 1F(2) is a graph of a detailed data set of the 1st derivative of cross-correlation channel data between positions 15,000 and 16,000 shown in FIG. 1F(1).
Figure 1G:
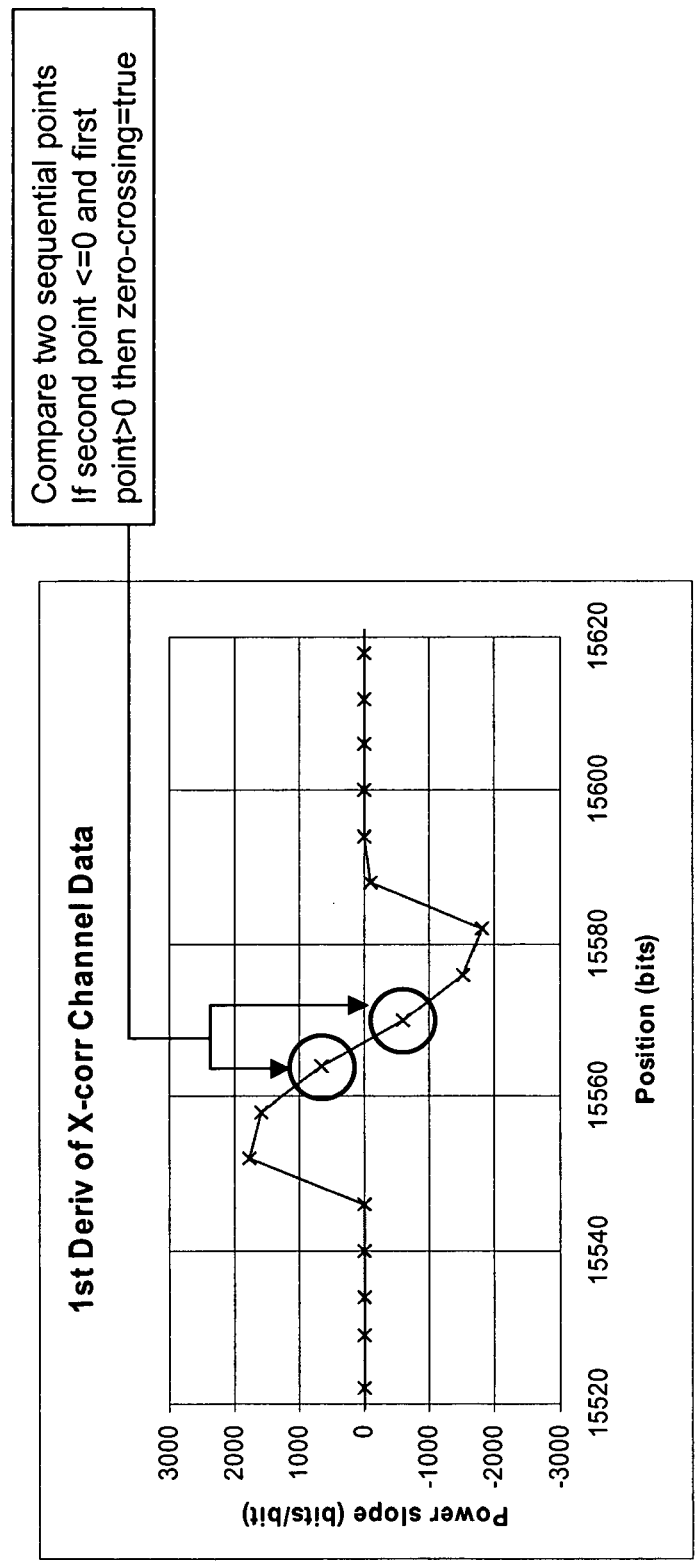
FIG. 1G relates to a zero-crossing test with respect to the finding step 26 shown in FIG. 1, and includes FIG. 1G(1) showing a graph of 1st derivative of cross-correlation channel data with power slope in bits/bit versus position in bits.
Figure 1H:
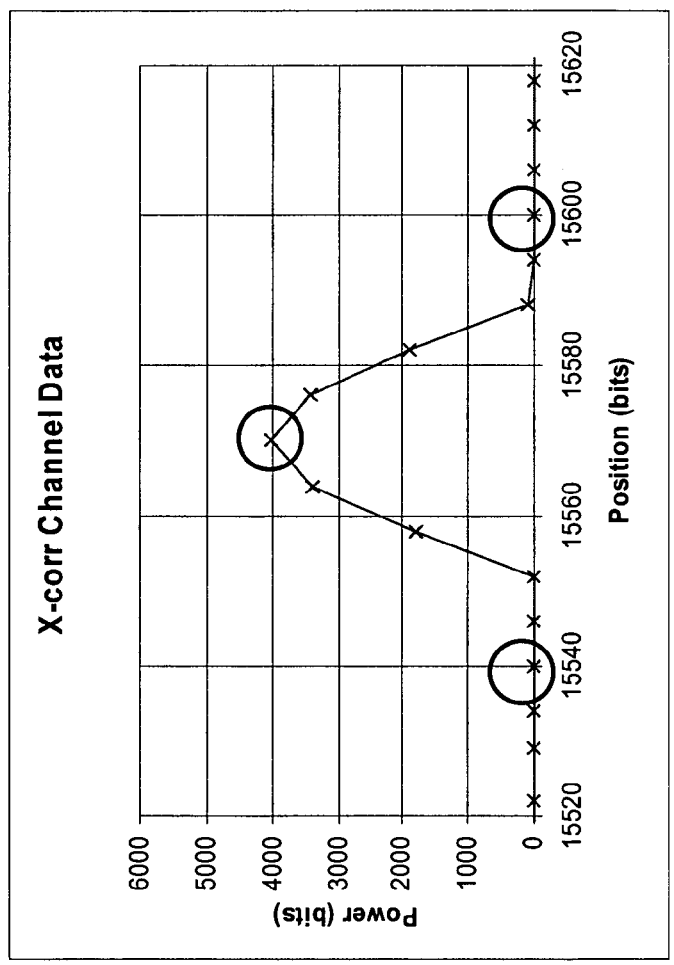
FIG. 1H relates to a width-depth test as one of the peak rejection criteria test(s) with respect to the applying step 28 shown in FIG. 1, and includes FIG. 1H(1) which is a graph of cross-correlation channel data between positions 15,520 and 16,620.
Figure 1I:
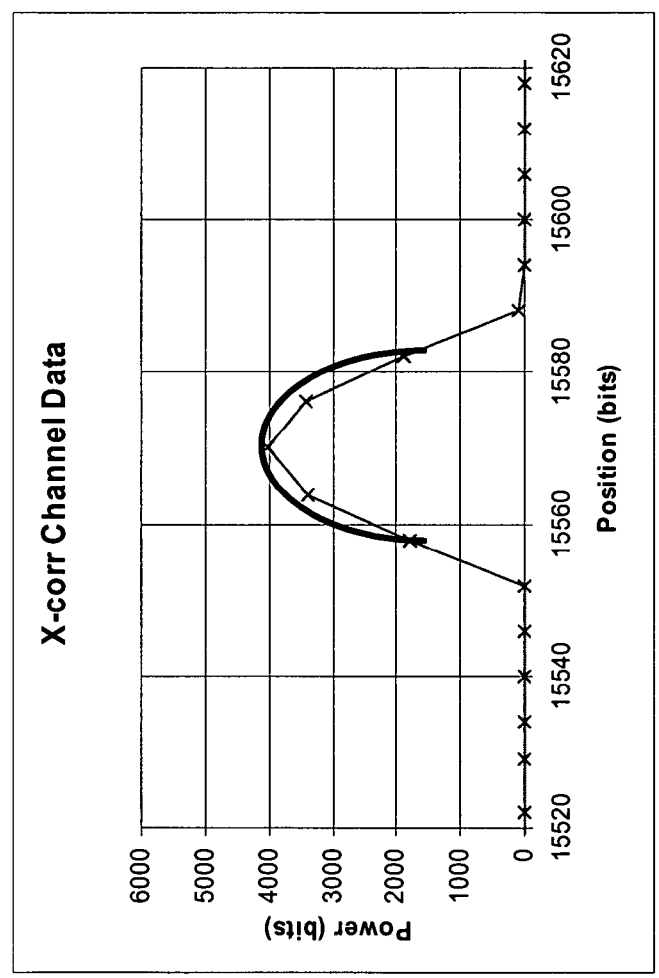

FIG. 1I relates to a compute root test as one of the peak rejection criteria test(s) with respect to the applying step 28 shown in FIG. 1, and includes FIG. 1I(1) which is a graph of cross-correlation channel data between positions 15,520 and 16,620.

Figure 1J:
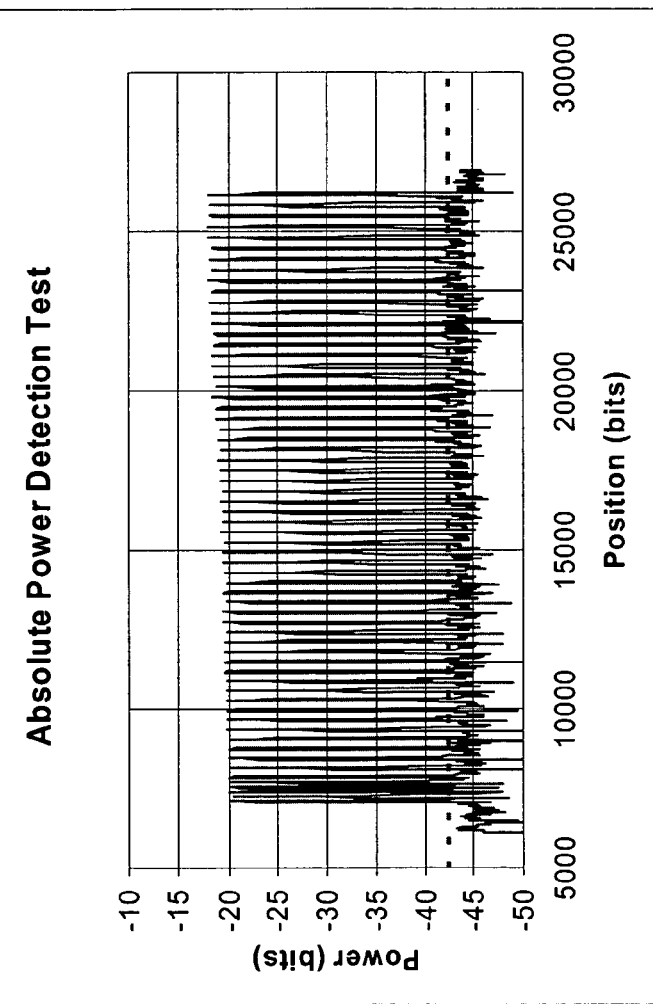

FIG. 1J relates to an absolute power test as one of the peak rejection criteria test(s) with respect to the applying step 28 shown in FIG. 1, and includes FIG. 1J(1) which is a graph of cross-correlation channel data between positions 5,000 and 30,000.

Figure 1K:
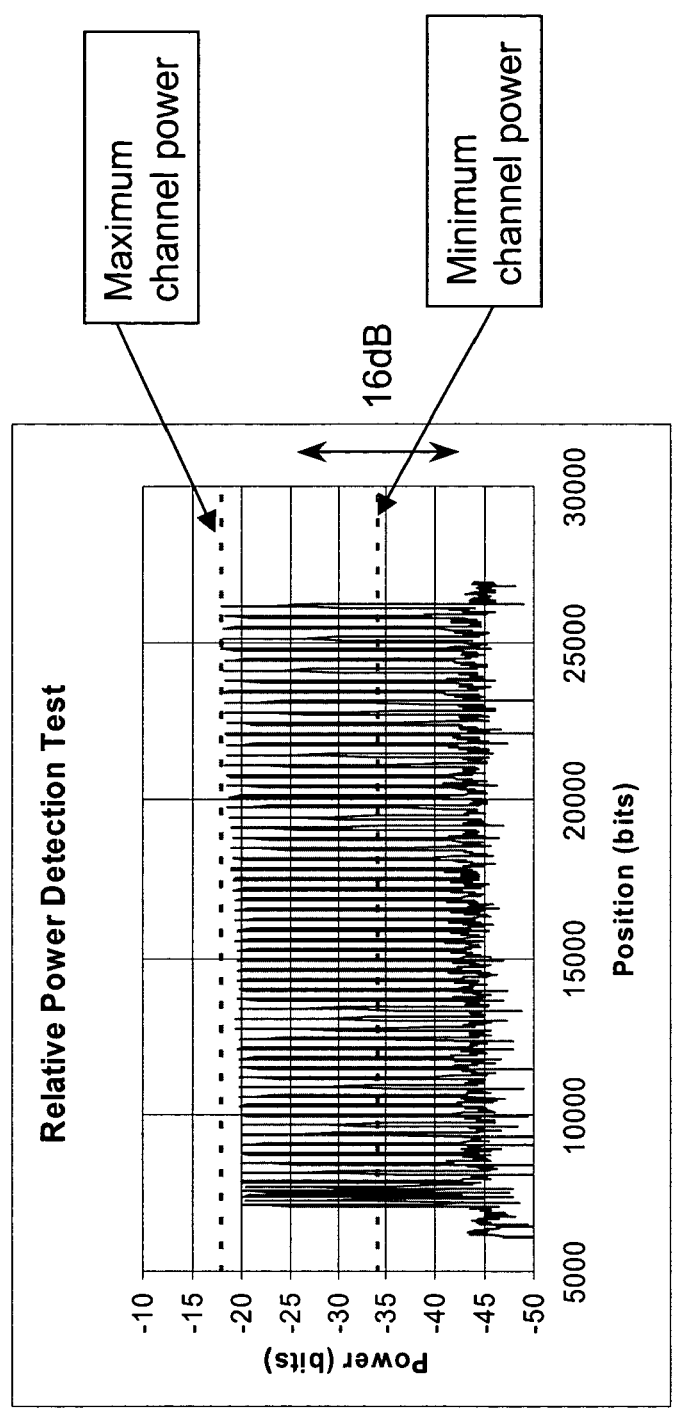

FIG. 1K relates to a relative power test as one of the peak rejection criteria test(s) with respect to the applying step 28 shown in FIG. 1, and includes FIG. 1K(1) which is a graph of a relative power detection test between positions 5,000 and 30,000.

Figure 2:
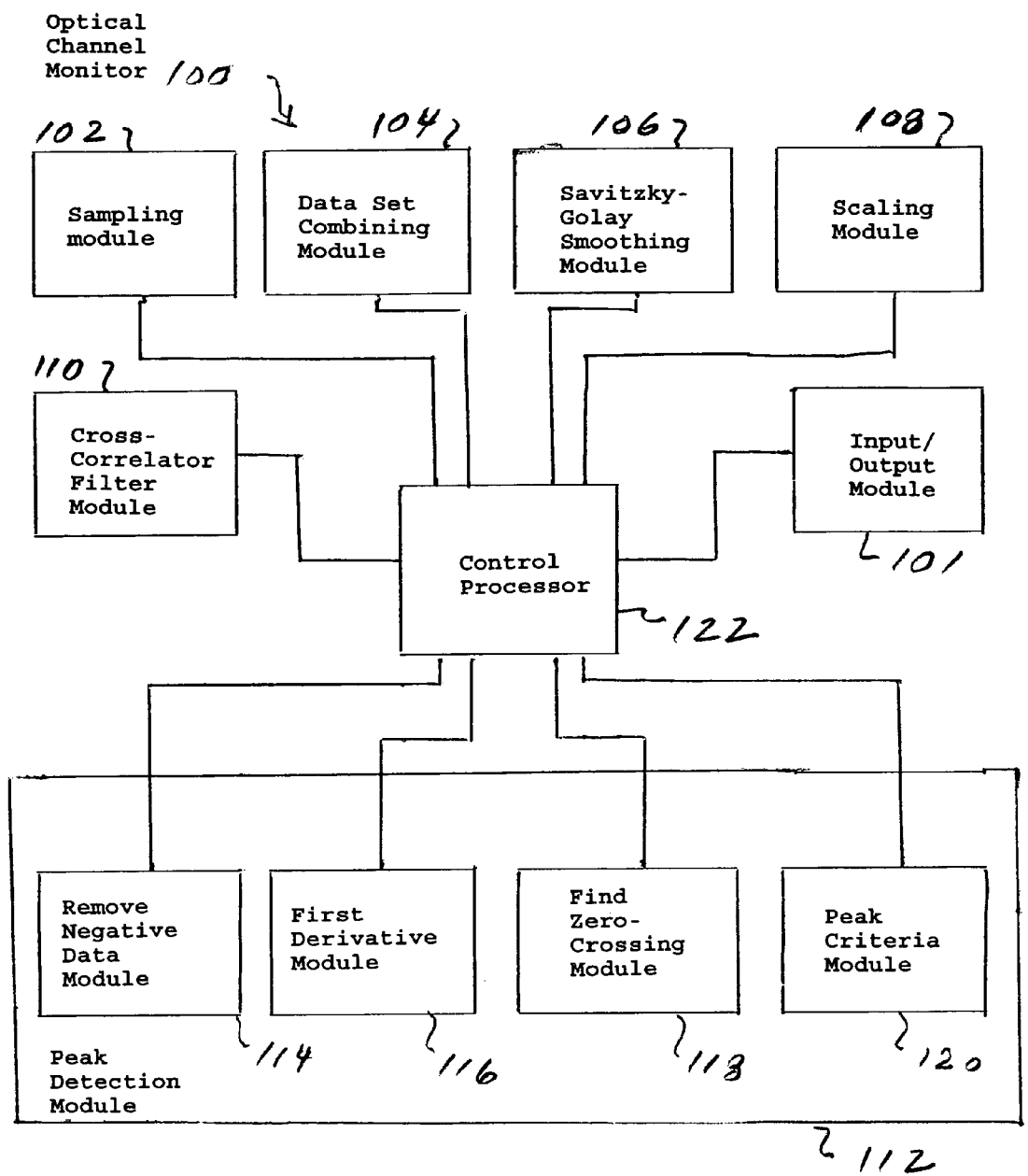

FIG. 2 shows a block diagram of an optical channel monitor that is the subject matter of the present application.

Figure 3:
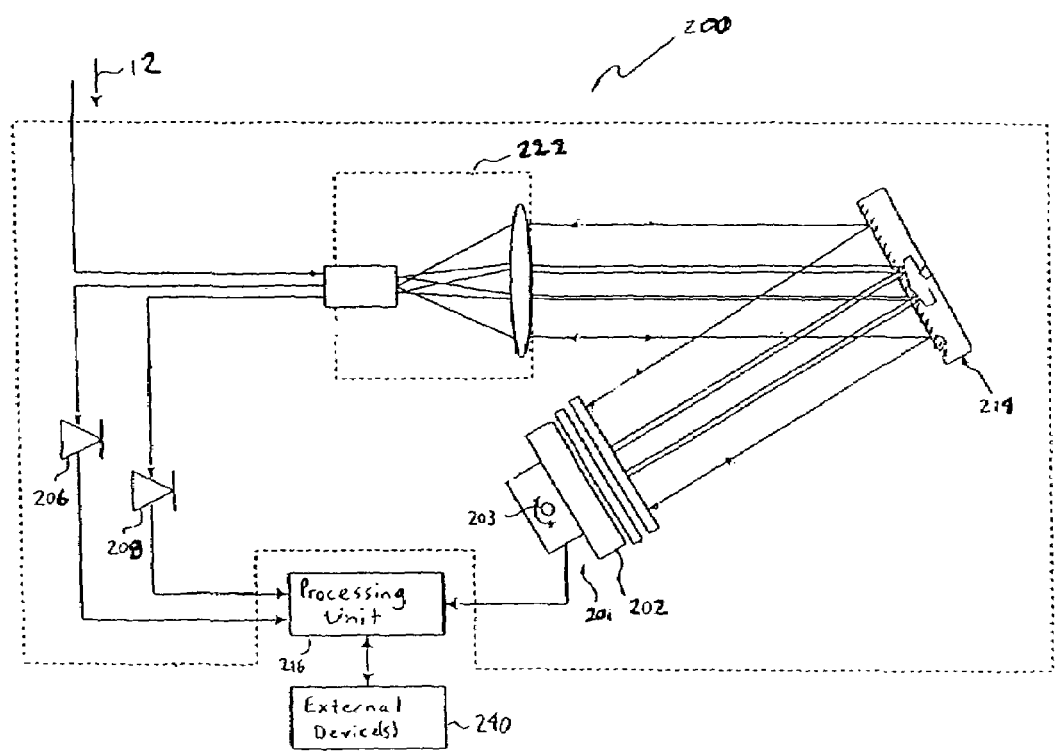

FIG. 3 shows a hardware configuration of the optical channel shown in FIG. 2.

BEST MODE FOR CARRYING OUT THE INVENTION

FIG. 1: The Flowchart

FIG. 1 shows a flowchart of a peak detection method or process generally indicated as 10 having a series of steps for detecting peaks in an optical signal that forms the subject matter of the present invention. The method may be used in an optical device, such as an optical channel monitor generally indicated as 100 shown in FIG. 2. The optical signal is typically a wavelength division multiplexed optical signal, having one or more optical channels respectively centered on one or more optical wavelengths $\lambda_1, \lambda_2, \lambda_3, \ldots, \lambda_N$. The optical channel monitor 100 has an input/output module 101 for receiving the optical signal.

FIG. 1A: The Sampled Data Step 12

FIG. 1A relates to a step 12 in FIG. 1 that includes sampling the optical signal to obtain sampled data containing information about the optical signal. The sampled data includes three sets of raw channel data, including two data sets containing information about start and stop pulses related to start and stop points of the oscillating light reflecting element disclosed in the aforementioned U.S. patent application Ser. No. 10/159,370 whose locations are used to calibrate a wavelength measurement in the optical channel monitor, and a third data set containing information about the optical signal having one or more wavelengths to be measured, which are provided, for example, as outputs from analog-to-digital converters (not shown) in the optical channel monitor.

FIGS. 1A(1) and 1A(2) show graphs of the raw channel data, which typically consists of 5,000 data points spaced on a nominal 25 picometer grid, which are shown by way of example. The scope of the invention is intended to include using other numbers of data points and other sized grids. For instance, embodiments are envisioned in which the number of data points is expanded to 64 K data points, while the size of the picometer grid is reduced to 10 picometers. In the embodiment discussed herein, the raw data sets contain linear high and low power values from both high and low gain amplifiers or detectors (not shown) in the optical channel monitor. Each of the high and low power values are a short signed 16-bit integer, although the scope of the invention is not intended to be limited to any given number of bits. The low gain data is represented as a negative number with a lowest value equal to −32,768 and a highest value equal to −1. The high gain data is represented as a positive number with a lowest value equal to 0 and a highest value equal to 32,767.

In FIG. 2, the optical channel monitor 100 has a sampling module 102 for performing the sampling step 12.

FIG. 1B: Removing Nominal Dark dc Components and Combining Short High and Low Data Step 14

FIG. 1B relates to a step 14 in FIG. 1 that includes both removing dark offsets from the data and combining short high and low data into a single long data set, which is a single long unsigned 32-bit value, as shown in FIGS. 1B(1) and 1B(2). The step also removes the nominal dark dc component of the detector and amplifier offsets to allow better linearization of the raw channel data. In FIG. 2, the optical channel monitor 100 has a data set combining module 104 for performing the removing and combining step 14 in FIG. 1.

FIG. 1C: The Savitzky-Golay Smoothing Filter Step 16

FIG. 1C relates to a step 16 in FIG. 1 that includes smoothing the sample data using a Savitzky-Golay smoothing filter to reduce random noise present in the sampled data and cross-correlating the data to remove quasi-dc components from the raw sampled data (e.g. amplified spontaneous emissions (ASE).

In FIG. 1C(1) the Savitzky-Golay smoothing filter is a third order filter and is a weighted average. The scope of the invention is not intended to be limited to using only a third order filter, because embodiments are envisioned using filters having other orders. In FIG. 2, the optical channel monitor 100 has a Savitzky-Golay smoothing filter module 106 for performing the Savitzky-Golay smoothing filter step 16 in FIG. 1.

In FIG. 1C(2), the cross-correlation filter is shifted so that the filter average value is less than 0 to remove quasi-dc components from the raw sampled data (e.g. amplified spontaneous emissions (ASE)). As shown by way of example, the cross-correlation filter consists of 11 points shaped like a typical optical channel monitor transfer function. The scope of the invention is not intended to be limited to using only an 11 point filter, because embodiments are envisioned using filters having other numbers of points. In FIG. 2, the optical channel monitor 100 has a cross-correlation filter module 110 for performing the cross-correlation filter step 20 in FIG. 1.

FIG. 1D: The Scaling Step 18

FIG. 1D relates to a step 18 in FIG. 1 that includes finding a maximum value in the 32-bit long data set and scaling the 32-bit long data set into 16-bit short values. The maximum data value is now reduced and scaled down to be short (16 bits) and less than 32,768. In FIG. 2, the optical channel monitor 100 has a scaling module 108 for performing the scaling step 18 in FIG. 1.

FIG. 1E: The Cross-Correlation Filter Step 20

FIG. 1E relates to a step 20 in FIG. 1 that includes applying a cross-correlation filter on the sampled data to obtain cross-correlated data containing information about one or more peaks in the optical signal. FIG. 1E(1) shows the cross-correlated channel data.

In one embodiment, all potential peaks must have a height in cross-correlation space greater than 1% of the maximum to prevent detection of noise spikes as peaks. However, the scope of the invention is not intended to be limited to any particular percentage value. Embodiments of the invention are envisioned using other percentage values.

In FIG. 2, the optical channel monitor 100 has a cross-correlation filter module 110 for performing the cross-correlating step 20 in FIG. 1.

Peaks can now be detected based on the cross-correlated data using the peak detection module 112 in FIG. 2.

FIG. 1E(2): Removing Negative Data Step 22

In the method of peak detection based on the cross-correlated data, FIG. 1E(2) relates to a step 22 in FIG. 1 for clamping all data from the cross-correlation with a value less than zero to equal zero. In FIG. 2, the peak detection module 112 has a remove negative data module 114 for performing the clamping step 22 in FIG. 1.

FIG. 1F: The Derivative Step 24

FIG. 1F relates to a step 24 in FIG. 1 that includes taking a first derivative of the cross-correlated data to derive a positive-to-negative zero-crossing to detect the one or more peaks in the derivative data. In this step, a simple first derivative is taken of the clamped cross-correlated channel data to allow the fundamental peak detection mechanism of a zero-crossing of this data to be employed. In FIG. 2, the peak detection module 112 has a first derivative module 116 for performing the derivative step 24 in FIG. 1.

FIG. 1G: The Zero-Crossing Step 26

FIG. 1G relates to a step 26 in FIG. 1 that includes applying a zero-crossing test to detect potential peaks. The zero-crossing test includes comparing two sequential points of the cross-correlated data and determining a zero-crossing point if a second data point is less than or equal to zero and a first data point is greater than zero.

In FIG. 2, the peak detection module 112 has a find zero-cross module 118 for performing the zero-crossing step 26.

FIGS. 1H/1I/1J/1K: The Peak Rejection Criteria Test Step 28

FIGS. 1H/1I/1J/1K relate to a step 28 in FIG. 1 that includes applying one or more peak rejection criteria tests, including either a width-depth test (FIG. 1H) based on the cross-correlation data, a compute root test (FIG. 1I) based on the cross-correlation data by comparing a calculated peak position in relation to a zero-cross location, an absolute power test (FIG. 1J) based on the sampled data, one relative power test based on the cross-correlation data, another relative power test (FIG. 1K) based on the sampled data, or a combination thereof. The one or more peak rejection criteria tests are performed in the peak criteria module 120 shown in FIG. 2.

FIG. 1H: The Width-depth Test

FIG. 1H relates to the width-depth test which includes comparing two points in the cross-correlated data X bits before and after a zero-crossing location. The width-depth test also includes the step of detecting a peak if the value on either side is less than a predefined percentage of a maximum peak value. As shown, X=5, and the test is passed if the value on each side is less than ⅕ of the maximum value. The scope of the invention is not intended to be limited to any particular number of bits used in the width-depth test. The width-depth test ensures that potential peaks have an associated width consistent with the width of a true peak. The intent here is to eliminate any broad peaks from being accepted.

FIG. 1I: The Compute Root Test

FIG. 1I relates to the compute root test which includes fitting a quadratic to X points around a zero-crossing point in the cross-correlated data and detecting a peak if a turning point is located within X bit(s) of the zero-crossing point. As shown, X=7 and the quadratic is fit around points around the zero-crossing to find a more accurate peak location. Under this test, a peak is valid if the turning point is located within 1 bit (25 picometers) of the zero cross point. This test is used to prevent a poor quality fit to the data by the software from generating an erroneous peak location.

FIG. 1J: The Absolute Power Test

FIG. 1J relates to the absolute power test which includes requiring that all peaks have a power greater than an absolute minimum allowable power of a peak. As shown by way of example, the absolute minimum is −42.5 dBm. However, the scope of the invention is not intended to be limited to any particular absolute minimum power value, which depends on and would be determined by the electrical noise of the circuit and the quality of the detection equipment being used. Embodiments of the invention are envisioned using other absolute minimum dBm power values.

FIG. 1K: The Relative Power Tests

FIG. 1K relates to the relative power test which includes requiring that all peaks be within a predefined percentage of a maximum peak level. As shown by way of example, all peaks must be within 16 dB of the maximum. However, the scope of the invention is not intended to be limited to any particular dB value, which depends on how closely spaced the peaks being detected and the quality of the optical transfer function of the device. Embodiments of the invention are envisioned using other dB values.

In addition, the other relative power test includes the step of removing all peaks that are lower than a predefined decibel below the highest peak in the sampled data.

FIGS. 2 and 3: The Optical Channel Monitor

FIG. 2 shows an optical channel monitor generally indicated as 100 having various modules for performing the detection of one or more peaks in an optical signal according to the invention. The optical channel monitor 100 includes the modules 102, 104, 106, . . . , 120 discussed above, as well as a control processor 122 for coordinating the same.

Any one or more of the modules 102, 104, 106, . . . , 120 may be implemented using hardware, software or a combination thereof. A typical software embodiment may be in the form of a microprocessor architecture having a microprocessor, a random access memory (RAM), a read only memory (ROM), an input/output device and a control, address and databus for connecting the same. The microprocessor would run a software program for performing the functionality of the given module.

The scope of the invention is not intended to be limited to implementation in only an optical channel monitor 100. Instead, the scope of the invention is intended to include using the method for detecting peaks in other optical devices, such as an Optical Spectral Analyzer and/or Bragg Grating Demodulator.

FIG. 3 shows a hardware configuration generally indicated as 200 which forms part of the optical channel monitor 100 in FIG. 2. This hardware configuration is shown and described in great detail in U.S. patent application Ser. No. 10/159,370 (CC-0514), filed May 31, 2002, entitled "Optical Channel Monitor," which is hereby incorporated by reference in its entirety. The hardware configuration of the optical channel monitor 200 includes a collimator 222, a diffraction grating 214, an oscillating reflective surface 201, a reflecting element 202, a pivot point 203, photodiodes 206, 208, a processing unit 216 and one or more external device(s) 240. In operation, input light 212 comes into the optical channel monitor 200 and passes through the collimator 222. The collimated light reflects off the diffraction grating 214 which separates the light. The reflecting element 202 pivots about the pivot point 203 for selecting a given channel from the separated light and reflecting it off the oscillating reflecting element 202 back to the diffraction grating 214. The diffraction grating 214 provides the reflected selected channel to the photodiodes 206, 208 and to the processing unit 216 for performing the peak detection processing steps set forth above. The processing unit 216 provides an output signal containing information about one or more peaks detected in the selected channel to the one or more external devices 240.

THE SCOPE OF THE INVENTION

The dimensions and geometries for any of the embodiments described herein, including the various graphs, are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein without departing from the spirit and scope of the present invention.

What is claimed is:

1. A method for detecting peaks in an optical signal comprising:

sampling the optical signal to obtain sampled data containing information about the optical signal;

applying a cross-correlation filter on the sampled data to obtain cross-correlated data containing information about one or more peaks in the optical signal;

detecting the one or more peaks in the optical signal based on the cross-correlation data;

wherein the detecting includes filtering the cross-correlated data so that all potential peaks have a height in cross-correlation space greater than 1% of a maximum peak height.

2. A method for detecting peaks in an optical signal comprising:

sampling the optical signal to obtain sampled data containing information about the optical signal;

applying a cross-correlation filter on the sampled data to obtain cross-correlated data containing information about one or more peaks in the optical signal;

detecting the one or more peaks in the optical signal based on the cross-correlation data, the detecting including applying a zero-crossing test to detect potential peaks;

wherein the zero-crossing test includes comparing two sequential points of the cross-correlated data and determining a zero-crossing point if a second data point is less than or equal to zero and a first data point is greater than zero.

3. A method according to claim 2, wherein the cross-correlation filter has an average value that is less than zero.

4. A method according to claim 2, wherein the detecting includes clamping the cross-correlated data so that all cross-correlated data having a value less than zero is clamped to equal zero.

5. A method according to claim 2, wherein the detecting includes taking a derivative of the cross-correlated data to derive a positive-to-negative zero-crossing to detect the one or more peaks.

6. A method according to claim 2, wherein the method further comprises smoothing the sample data using a Savitzky-Golay smoothing filter to reduce random noise present in the sampled data.

7. A method according to claim 2, wherein applying the cross-correlation filter includes removing quasi-dc components from the sampled data.

8. A method for detecting peaks in an optical signal comprising:

sampling the optical signal to obtain sampled data containing information about the optical signal;

applying a cross-correlation filter on the sampled data to obtain cross-correlated data containing information about one or more peaks in the optical signal; and detecting the one or more peaks in the optical signal based on the cross-correlation data, the detecting including applying one or more peak rejection criteria tests, including either a width-depth test based on the cross-correlation data, a compute root test based on the cross-correlation data, an absolute power test based on the sampled data, one relative power test based on the cross-correlation data, another relative power test based on the sampled data , or a combination thereof;

wherein the width-depth test includes comparing two points in the cross-correlated data X bits before and after a zero-crossing location.

9. A method according to claim 8, wherein the width-depth test also includes detecting a peak if the value on either side is less than a predefined percentage of a peak value.

10. A method according to claim 8, wherein the compute root test includes fitting a quadratic to X points around a zero-crossing point in the cross-correlated data and detecting a peak if a turning point is located within X bit(s) of the zero-crossing point.

11. A method according to claim 8, wherein the absolute power test includes requiring that all peaks have a power greater than an absolute minimum allowable power of a peak.

12. A method according to claim 8, wherein the one relative power test includes requiring that all peaks be within a predefined percentage of a maximum peak level.

13. A method according to claim 8, wherein the another relative power test includes removing all peaks that are lower than a predefined percentage below the highest peak in the sampled data.

14. A method for detecting peaks in an optical signal comprising:
 sampling the optical signal to obtain sampled data containing information about the optical signal;
 applying a cross-correlation filter on the sampled data to obtain cross-correlated data containing information about one or more peaks in the optical signal; and
 detecting the one or more peaks in the optical signal based on the cross-correlation data,
 wherein the sampled data includes raw channel data, including two data sets containing information about start and stop pulses whose locations are used to calibrate a wavelength measurement, and a third data set containing information about the optical signal having one or more wavelengths to be measured.

15. A method according to claim 14, wherein the raw data sets contain high and low power values from both high gain amplifiers and low gain amplifiers.

16. A method according to claim 15, wherein each of the high and low power values are a short signed 16-bit integer.

17. A method according to claim 15, wherein the method includes combining the high power values and the low power values into a long data set.

18. A method according to claim 17, wherein the long data set is a long unsigned 32-bit value.

19. A method according to claim 17, wherein the combining also includes removing nominal dark output and amplifier offset dc components in the raw data sets.

20. A method according to claim 17, wherein the method includes finding a maximum value in the long data set and scaling the long data set into short values.

* * * * *